Jan. 29, 1929.                                                              1,700,716
J. OSTERTAG
METHOD FOR CLEARING AND PURIFYING WATER FOR STEAM BOILERS OF ALL KINDS
Filed July 10, 1922
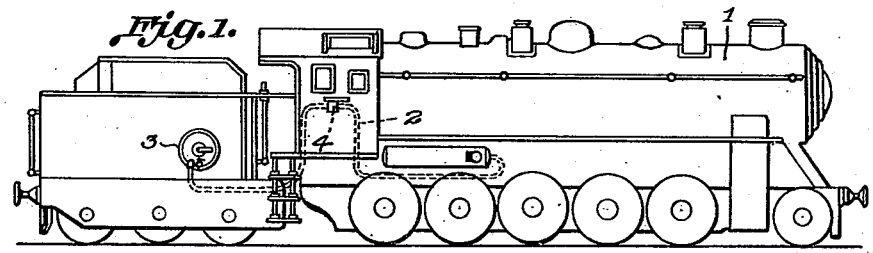
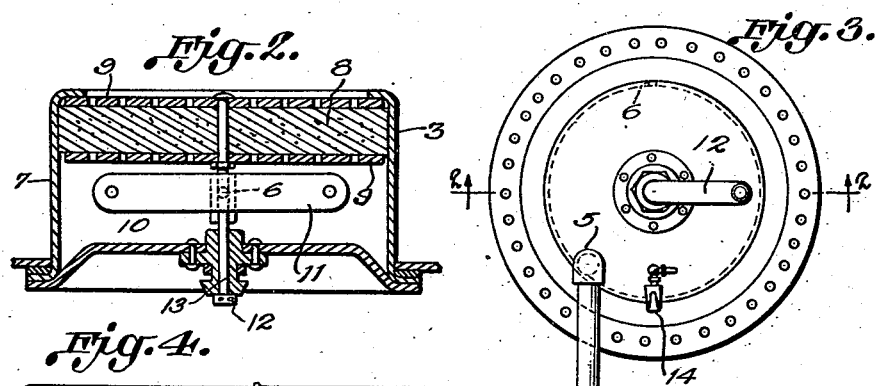
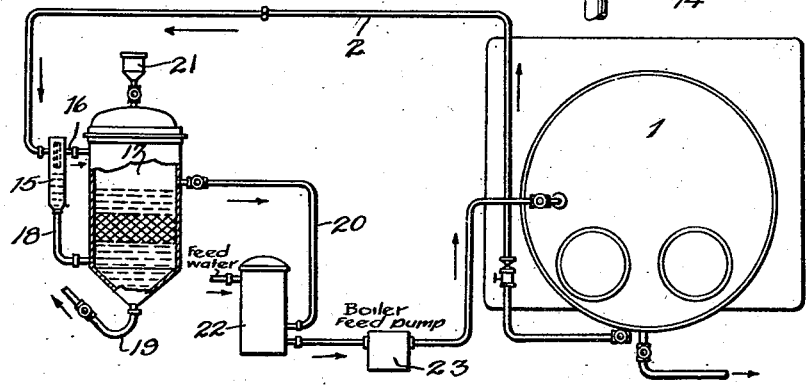
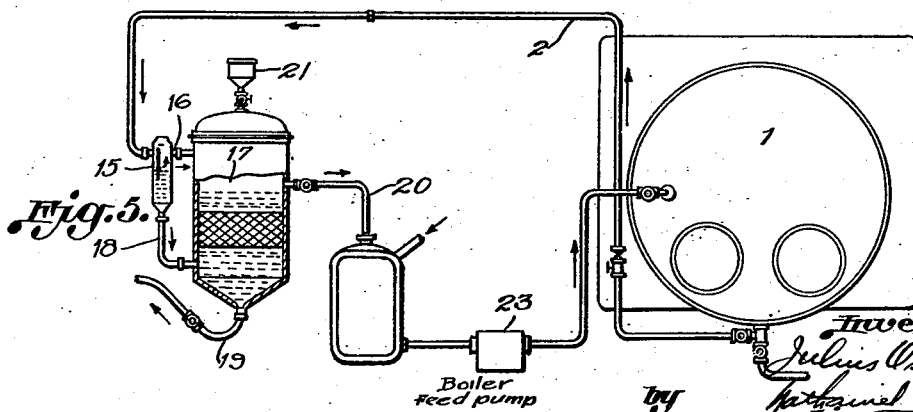

Patented Jan. 29, 1929.

1,700,716

UNITED STATES PATENT OFFICE.

JULIUS OSTERTAG, OF STUTTGART, GERMANY.

METHOD FOR CLEARING AND PURIFYING WATER FOR STEAM BOILERS OF ALL KINDS.

Application filed July 10, 1922, Serial No. 573,825, and in Poland February 8, 1922.

The present invention relates to a method and apparatus for purifying the feed-water for steam boilers of all kinds with and without condensation by injection, particularly for locomotive and marine boilers and especially suited to cases where a high non-carbonate hardness is present, and where through the precipitation of the substance causing such hardness large quantities of easily soluble salts are produced or are already present in the unpurified water. The present invention makes it possible for small works to have an arrangement occupying little space and for the steam working to be carried out free from disturbance.

Moreover the invention contemplates the economic advantage that the heat and the water of a boiler that is emptied, and which hitherto have been lost, may be recovered in the purifying reservoir and utilized again in another boiler.

Examples of the method of carrying out the invention are illustrated in the drawings. Fig. 1 illustrates the carrying out of a method of removing hardness in the water of a locomotive.

Figs. 2 and 3 are respectively an axial section and an end elevation view of a filter intended for locomotives.

Figs. 4 and 5 illustrate diagrammatically the arrangement for softening the feed-water for ships' boilers.

In the case of a portable boiler, that is to say, a locomotive boiler, the method according to the present invention is carried out in the following manner (Figs. 1 to 3).

In a locomotive or the like there is no room for setting up large apparatus. The boiler itself must therefore be employed as a reaction chamber, that is to say, the hardness is not eliminated in a separate purifying apparatus, but in the boiler itself and the separated sludge carried off to the feed-water reservoir or tender by means of a boiler-water pipe.

In the tender a filter can be built which holds back the sludge brought back through the boiler-water pipe and only allows the filtered boiler water to pass into the tender.

From any preferred point in the boiler 1, inside the water space, boiler water is continuously or intermittently taken through a pipe 2 and introduced into the tender through a filter 3. The cock 4 serves for regulating the boiler water flowing to the filter 3. In case chemicals are necessary for softening the water these are placed directly in the tender.

The filter necessary for filtering the water coming out of the boiler can only have relatively small dimensions, as it must take up little space in the tender or water tank. In Fig. 2 or 3 the example of the construction of such a filter is illustrated.

Through the opening 5 of the filter the boiler water containing sludge enters. As now in the filter and water tank a considerably lower pressure prevails than in the boiler water pipe heat of liquid is freed from the boiler water, whereby a portion of the boiler water passes into the steam chamber. The remaining portion of the boiler water cools in this process to about 100° C. The steam produced through the releasing of the heat of liquid escapes through the opening 6 and condenses in the contents of the tender. The surface 7 of the filter casing that comes in contact with the tender water gives out heat in its vicinity to the water in the tender and thereby contributes likewise to the condensation of the steam formed. If no opportunity were given to the steam to condense, it would like the water, have to take its way through the filter 8, which is pressed in between two filter plates 9. As the volume of the steam is relatively large the sludge on and in the filter would be carried along into the tender space or water tank, whereby increase of sludge in the tender water would soon be observed, but as the steam has an opportunity to condense into the tender water, the boiler water is calmly forced through the filter. Thus the carrying along of sludge into the tender is prevented.

It is very important to take measures so that the filter can be used for the longest possible time. For this purpose a paddle wheel 11 or the like is arranged in the preliminary chamber 10. This wheel can be rotated by means of a lever situated outside the tender. The transmission of the rotary motion of the lever 12, is effected through a shaft 13. At certain periods of time the paddle wheel 11 is rotated and the water in the preliminary filter chamber set in rotation. Thereby the sludge which is on the filter surface as well as that deposited in the preliminary filter chamber, is uniformly imparted to the water. For the removal of the sludge it is only necessary to open the cock 14 until clear water appears. Through the opening of the cock 14 water flows out of the tender through the filter 8. Thereby the latter is rinsed—any adhering sludge is likewise removed.

The arrangement for marine boilers is similar to that for locomotives. In order to ensure success, the contrivance must be adapted to existing conditions. The purifying of the feed water for marine boilers has failed hitherto because the water purifying apparatus was much too extensive and the heavy weight of the same had an objectionable influence on the draught of the ships. The above described invention with suitable alterations can also be employed for marine boilers.

The method as employable for marine boilers is described as follows (see Figs. 4 and 5).

In order to avoid the setting up of large receptacles or reservoirs, the feed water is introduced into the boiler in its original state and there the hardness eliminated through the high temperature of the boiler water, and, if necessary, by an addition of chemicals, such as soda and the like. In Fig. 4, the example of construction of such an installation is shown for ships which have condensation by injection. In Fig. 5 a similar installation is illustrated, which is employed where surface condensation exists. If both kinds of condensation exist, a combination of the two forms of construction can be adopted.

As already mentioned, the unpurified water is introduced into the boiler 1 in its original state, or in case arrangements already exist for such purpose in a preliminarily purified condition. The substances causing hardness and eliminated by heating or through addition of chemicals, are conveyed in the form of sludge through the boiler water pipe 2 into a separating cylinder 15. In this, considerably lower pressure prevails than in the boiler water pipe 2. In consequence of this, a quantity of heat of liquid corresponding to the difference of pressure is freed in the form of steam. The steam produced through the reduction of pressure is conveyed through a pipe 16 into the upper part of a filter receptacle 17, whilst the water that remains and has cooled correspondingly to the difference of pressure enters the lower part of the filter receptacle 17, through a pipe 18. The water flows upwards from below into this built-in filter. In connection herewith the sludge is deposited in the lower part of the filter receptacle 17 and can be carried off through a pipe 19. The filtered boiler water now comes above the built in filter and together with the steam is carried off through a pipe 20. At any preferred place in the filter receptacle 17, a device 21 is employed for introducing the chemicals into the water. So far both forms of construction are alike. Now, as appears from Fig. 4 as regards installations with condensation by injection, the mixture of filtered boiler water and steam is conveyed through the pipe 20 into a store chest or reservoir 22. There the filtered boiler water collects until the feed-pump 23 begins to work, which then takes from it the mixed condensate and raw water. This water has ordinarily a temperature of 30 to 40°. As soon as the pump 23 begins to work, the filtered water collected in the store chest 22 is acted upon suctionally, likewise the steam that is in the upper part of the filtering receptacles. The steam is condensed through being mixed with the unpurified cold water.

In installations for surface condensation according to Fig. 5, the mixture of filtered boiler water and steam flows through the pipe 20 to the surface condenser, in order to mix there with the condensed water produced there, and together with the latter to be reconveyed to the boiler 1. In cases, where surface condensation exists, corrosions usually appear in the boiler. These arise, because owing to permeable places in the condenser, air penetrates to the condensed water and is eagerly dissolved thereby. In consequence of the provision of the device 21 that regulates the addition of soda or the like, the condensed water can be obtained or kept in an alkaline state, whereby any attack by the dissolved or dissociated oxygen on the sides of the boiler is prevented.

I claim:

1. In a method of continuously purifying boiler water during normal operation of a boiler, the steps of continuously blowing off boiler water containing sludge, conducting the blow-off water to a region of lower pressure while maintaining its heat content to generate steam, filtering the remaining blow-off water, condensing the generated steam, and returning the condensate and the filtered blow-off water to the boiler.

2. In a method of continuously purifying boiler water during normal operation of a boiler, the steps of continuously blowing off boiler water containing sludge, conducting the blow-off water to a region of lower pressure while maintaining its heat content to generate steam, filtering the remaining blow-off water, chemically treating the filtered blow-off water, condensing the generated steam, and returning the condensate and the filtered blow-off water to the boiler.

3. In a method of continuously purifying boiler water during normal operation of a boiler, the steps of continuously blowing off boiler water containing sludge, conducting the blow-off water to a region of lower pressure while maintaining its heat content to generate steam, filtering the remaining blow-off water, condensing the generated steam, adding the condensate and the filtered blow-off water to make-up water to form feed water, and supplying the feed water to the boiler.

4. In a method of continuously purifying boiler water during normal operation of a boiler, the steps of continuously blowing off boiler water containing sludge, conducting the blow-off water to a region of lower pressure while maintaining its heat content to generate steam, filtering the remaining blow-off water, chemically treating the filtered blow-off water, condensing the generated steam, adding the condensate and the filtered blow-off water to make-up water to form feed water, and supplying the feed water to the boiler.

In testimony whereof I affix my signature.

JULIUS OSTERTAG. [L. S.]